Patented Feb. 23, 1937

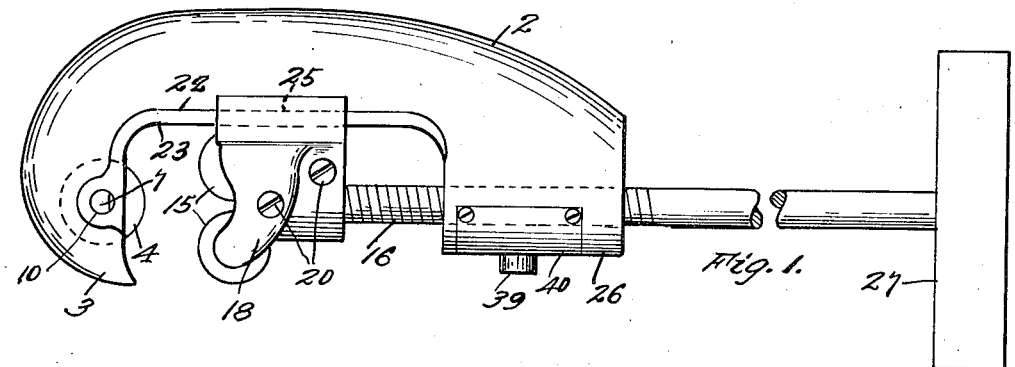

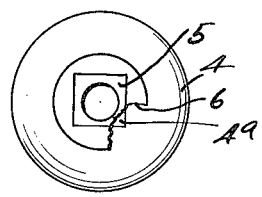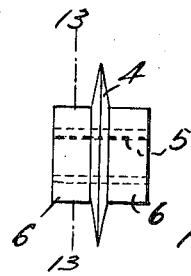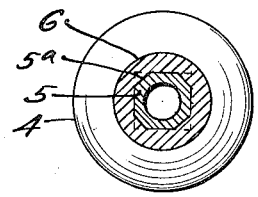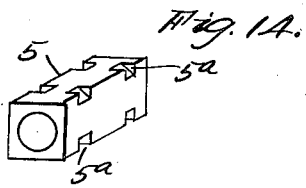

2,071,756

UNITED STATES PATENT OFFICE 2,071,756

QUICK ADJUSTING PIPE CUTTER

George D. Manville, Los Angeles, Calif.

Application November 25, 1935, Serial No. 51,411

2 Claims. (Cl. 81—192)

This invention is an improved pipe or tube cutter of the hand tool class.

The tool incorporates a non-shifting support for a rotary severing disc and a shifting carriage for a pair of back-rest rollers and it is an object to provide a simple, practical and substantial means for quickly setting the adjustable carriage with its rollers toward a pipe to be cut when it is interposed between the cutter and pressure-applying back-rest rollers.

Another object is to provide means to facilitate the interchange of the cutting disc from time to time as may be needed due to wear or breakage, and to effect its secure, operative attachment to the respective support.

And an object is to provide for the facile attachment of an actuating screw to the carriage, and for the attachment and detachment of the carriage to the tool body proper, and for the substantial support of the pressure applying rollers in the carriage.

An additional object is to provide, in the quick-adjustment means, means to utilize the re-action pressure on the screw for increasing the interlocking relation of the screw with a complementary or nut member of the device, and further, in this connection, an object is to provide a disconnected means in association with the nut to effect its ready release from the screw from time to time in use of the tool so that the screw and the carriage may be quickly shifted in avoidance of the much slower screw-action for the adjustment of the pressure rollers.

The invention consists in certain advancements in this art as set forth in the ensuing disclosure and having, with the above, additional objects and advantages as set out hereinafter, and whose manner of operation and construction, combination and means, and details of features will be made manifest in the description of the herewith disclosed and illustrative embodiment, it being understood that modifications, variations and adaptations may be resorted to within the scope, principle and spirit of the invention as it is more directly claimed hereinbelow.

Figure 1 is a side elevation of the tool. Figure 2 is a bottom plan of the tool; omitting a part of its screw shank. Figure 3 is a detail of the cutting disc pin and mounting, and Figure 4 is a sectional elevation thereof. Figure 5 is a sectional plan showing a retaining C-spring countersunk in the disc pin. Figure 6 is a sectional elevation of the power screw and nut device; whereby presser rollers may be quickly shifted along the tool body to the cutting position and then advanced by slow screw feed to force the metal being cut against the cutting wheel or disc, and then quickly and easily retracted without screw action. Figure 7 is an inside face view of the left hand side section of the roller carriage, and Figure 8 is a front end elevation of the carriage and cross-section of the tool body at the plane of the carriage face. Figure 9 is a longitudinal section of a portion of the body, with the screw nut assembly in elevation. Figure 10 is a perspective of the nut push-back spider.

Figure 11 is a side elevation and Figure 12 is an edge view of the cutting wheel unit. Figure 13 is a cross-section on line 13—13 of Fig. 12. Figure 14 is a perspective of the pin sleeve of the wheel unit.

The tool body 2 has at its forward end a laterally extending beak 3 with a pocket in which is disposed a suitable cutting wheel disc 4 which is journaled on a stout pin 7. This pin slidably fits in a bearing hole 8 in the beak and has its remote end flattened on one side 9 to non-turnably fit in a complementary bearing hole 10, the end of the flat face forming a stop shoulder 11 to engage the beak.

For the purpose of removably interlocking the pin 7 in its mounting 8—10 there is countersunk in the flattened end of the pin a C-spring 12, Fig. 5, whose outside diameter is slightly greater than the diameter of the pin 7 and which is capable of contracting into the pin when this is forced into the bearing holes 8—10 and then expanding to its normal size and ultimately interlocking in an annular counterbore 13 at the outer end of the bearing hole 10.

The open side of the retaining C-spring is sunk in the flat face of the pin 7, Fig. 5, and assembly of the pin, with its spring 12, is facilitated by registering the flat face of the pin with the flat side of the bearing and entering it. A light, sharp hammer blow will readily drive the interlocking pin into or from place from time to time for change of cutting discs.

An object, such as a piece of pipe, to be cut is introduced between the disc 4 and a pair of suitable pressure or back-rest rollers 15 which are on axes parallel to the disc axis and are on opposite sides of the axis of a power screw 16 which is radially disposed as to the disc.

The rollers and the screw are mounted in or attached to a carriage consisting of a pair of right and left sections 17—18 having meeting inner faces 19 fastened in abutment by screws 20 after the sections have been assembled on the body 2 in such manner that bead rails 21—22 lying along opposite, inner corners of re-entrant face or side 23 of the body, enter longitudinal recesses 24—25 along the inner, side faces of the respective carriage sections 17—18. The re-entrant face 23 lies along the body 2 between the beak 3 and a nut box 26, at the rear end of the main body 2, through which the screw 16 passes and is provided with an unthreaded shank part having a suitable handle 27.

The carriage 17—18 provides an internal chamber in which are disposed the rollers 15 and the section 17 is further provided with flat-side pockets 28 into which are firmly driven the complementary ends of roller spindles 29 on which the rollers have free rotation in the carriage chamber. The opposite ends of the spindles 29 slidably take into respective pockets 30 in the carriage section 18: the several pockets 28—30 are blind, that is, they do not come through the carriage wall sections.

A feature is the simplicity of connection between the power screw 16 and the carriage 17—18, both as to the mode and the means. The screw has a neck 31 and a head 32 on its front end and the carriage provides a pocket 33 with rear side flanges 34 complementary to the head and neck of the screw and providing for rotation of the latter to cause the advance of the rollers 15 with high pressure against the piece to be cut by the tool. This device for the attachment of the screw to the carriage obviates extra separable or movable contrivances with the incidental cost and liability of loss, and the carriage for holding the rollers and the power screw consists of but the two sections 17—18 and the screws 20 as separable parts.

The nut box 25 is provided with a non-circular recess in which is non-turnably sunk an oblong half-nut 35 complementary to the screw 16 and normally pressed thereagainst by a compressed spring 36 sunk in the bottom of the box 25. On the outer side of the screw and opposite to the half-nut there is provided a semicylindrical element 37 whose longitudinal edges 38 approach the nut part on the opposite side of the screw 16 but are normally out of contact therewith.

The element 37 or spider has an outwardly projecting thumb button 39 passing through a cover piece 40 suitably attached to the box and retaining the spider in the box chamber. When it is desired to quickly shift the screw and the carriage forward or backward it is only necessary to press the button inward enough to engage and repress the nut part 35 to clear it from the screw provided the screw is not at the moment under reaction of pressure of the rollers 15 engaging a piece to be or being cut. The freedom of the nut 35 from the repressive spider 37 is an advantage as it is therefore free to easily adjust itself on the threads of the screw.

A further feature is the provision of a device to tend to interlock the nut 35 onto the screw threads under work resistance and prevent backslip of the nut during tool action on work. This is incorporated in the structure of the thread of the power screw 15. In Fig. 6 it will be noticed that the rear face 35$^a$ of the thread 35$^b$ is pitched inwardly and forwardly and forms a substantial hooking effect with the engaged threads of the nut part 35, and the higher the work reaction on the screw as the carriage is advanced the greater will be the inward drawing tendency of the inclined hooking face 35$^a$ on the nut 35.

The body 2 is of cast metal, preferably, and the rail beads 22 extend around the angles of the bed ends and greatly reinforce the tool without need of an inserted stiffener and permits coring out of the body; the beads being unbroken in their length.

When released from the nut 35 the screw 16 can be quickly shifted to move the carriage 17—18 toward the piece to be cut, then the nut is released from the spider and permitted to again engage the screw while this is turned to force the work against the wheel 4.

To obtain a low cost cutting wheel unit the disc 4 is punched to form a non-circular center hole 4$^a$ into which is driven the complementary part of a bushing or sleeve 5 turnably fitting the pin 7; the sleeve here being shown as of square section and its facets holding the disc 4 against relative rotation. The sleeve is notched or recessed, beyond the sides of the disc, at 5$^a$ and the hubs 6 are cast on the sleeve beside the disc and thus key into the recesses against rotation and solidly flank the adjacent disc which intervenes.

What is claimed is:

1. In a pipe cutter, quick adjustment means including a body provided with a pipe cutting device and a box part, a pressure screw freely slidable in said box part for quick adjustment, a spring sunk in said part and a parallel sided half-nut thrust by said spring against the near side of the screw, a spider loosely mounted in said part on the side of the screw opposite to the nut and having a button, said box having an outwardly opening nut pocket, and a cap through which said button extends outward for thumb pressure to thrust the spider against the nut and repress it for quick axial shift with the said body as to the screw; said cap being detachable for outward removal of the spider, the nut and the spring.

2. A pipe cutter as set forth in claim 1, and in which said body is provided with a re-entrant face extending from the box part and parallel to said screw, and having corner bead rails, and a carriage engaging and slidable on said rails and being swivelled on the near end of said screw.

GEORGE D. MANVILLE.